United States Patent Office 3,375,157
Patented Mar. 26, 1968

3,375,157
CONTROLLING AND ERADICATING AGRICULTURAL NEMATODES WITH HALOGENATED PHENYL PROPYNYL ETHERS
Earl P. Williams, Pen Argyl, Pa., assignor to General Aniline & Film Corporation, New York, N.Y., a corporation of Delaware
No Drawing. Filed Oct. 24, 1963, Ser. No. 318,533
8 Claims. (Cl. 167—30)

ABSTRACT OF THE DISCLOSURE

A method is provided for controlling and eradicating nematodes from nematode infested soil by applying to or spraying such soil with a nematocidal amount of a halogenated phenyl propynyl ether.

---

The present invention relates to a method of controlling and eradicating agricultural pests such as insects, fungi and nematodes with halogenated phenyl propynyl ethers.

Various organic compounds are currently employed in the control and eradication of agricultural and fluoricultural pests. Aldrin (1,2,3,4,10,10-hexachloro-1,4,4a,5,8,8a-hexohydro-1,4,5,8-dimethanonaphthalene) are highly toxic products, and insecticidal formulations containing them must be handled with extreme care. Parathion (0,0-diethyl-o-p-nitrophenyltheiophosphate) is a remarkably effective insecticide, and has been put to use on farms and greenhouses to control many kinds of destructive insects infesting various crops. Because of its extreme toxicity to warm blooded animals, this potent insecticide cannot be used to control insects affecting man and animals.

Insecticides differ in degree of toxicity. Man can tolerate pyrethrum and sulfur in rather large quantities, but small amounts of any one of the foregoing compounds would be dangerous. Special care must be observed in applying sprays or dusts containing the foregoing insecticides, especially the organic phosphorous compounds. It is absolutely essential to avoid breathing the dust or vapor of spray mist, and to avoid skin contact. Under conditions where large amounts of sprays or dusts are applied, the operator must wear a respirator together with waterproof or protective clothing that will cover all exposed skin surfaces.

Fumigants differ from insecticides in that the fumes must be confined so that the insect or pest is exposed to a considerable concentration for some time. Practically all of the presently available soil fumigants are toxic to plants, and for this reason the manufacturers strongly urge and recommend that they be diffused out of the soil before a crop is planted, otherwise the plants may be stunted. The time required for adequate areation of the soil varies greatly, and is influenced by many factors, including the kind of soil, the condition of the soil, and the fumigant used together with other factors.

It is the principal object of the present invention to provide a method of protecting chlorophyllaceous plant material against attack by various insects, fungi nematodes with a pesticidal amount of a halogenated phenyl propynyl ether which is not toxic within certain limits of concentration to plants and warm-blooded animals.

Other objects and advantages will become manifest from the following description.

I have discovered that halogenated phenyl propynyl ethers having the following general formula:

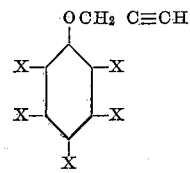

wherein X represents either hydrogen or chlorine and at least one of the X's being chlorine, are effective insecticides, fungicides and nematocides when employed in a concentration ranging from 0.001 to 20% by weight either in a liquid medium or a solid carrier.

As specific examples of such halogenated phenyl propynyl ethers the following are illustrative:

(1) 2-chlorophenyl propynyl ether,
(2) 4-chlorophenyl propynyl ether,
(3) 2,4-dichlorophenyl propynyl ether,
(4) 2,4,5-trichlorophenyl propynyl ether,
(5) 2,4,6-trichlorophenyl propynyl ether,
(6) 2,3,4,6-tetrachlorophenyl propynyl ether,
(7) 2,3,4,5,6-pentachlorophenyl propynyl ether.

The foregoing halogenated phenyl propynyl ethers are well known compounds and readily prepared in accordance with the procedure given in chemical literature by the condensation of 1 mole of a halogenated phenol with 1 mole of propargyl of bromide in the presence of an inert solvent diluent such as acetone and in the presence of potassium iodide as the condensation catalyst and in the presence of potassium carbonate as the acid acceptor under reflux for a period of time ranging from 12 to 24 hours. To the reaction mixture there is added distilled water followed by the removal of the liquid by decantation from the solid condensation product. The solid is then re-crystallized from glacial acetic acid.

For sake of brevity the foregoing numbered halogenated phenyl propynyl ethers will be referred to hereinafter as as pesticidal agents. These agents may be applied in a solid carrier such as charcoal, clay, talc, pumice, fuller's earth or in other commercially available inert fillers commonly employed in the compounding of insecticides and in fungicides. They are best applied however, in a liquid carrier, either as a solution, dispersion or emulsion. When water is to be employed as a part of the liquid carrier, halogenated phenyl propynyl ether is first dissolved in a suitable water-miscible organic solvent, such as acetone, methyl ethyl ketone, dioxane, and the like, to which has been added a sufficient quantity of any commercially available surface active agent which will maintain the dispersion of the halogenated phenyl propynyl ether in the liquid medium. Any of the well known and commercially available surface active agents which will maintain the dispersion of the halogenated phenyl propynyl ether in the liquid medium. Any of the well known and commercially available surface active agents may be employed, such as for example, the alkali metal salts of long chain alkyl sulfates, alkali metal salts of alkyl aryl sulfonic acids, polyethylene glycols ethers of alkyl phenols, etc. Products of this type are legion and no difficulty will be encountered in the selection of the most suitable surface active agent which will depend of course upon price, availability, etc.

The halogenated phenyl propynyl ethers may also be applied in non-aqueous media, such as light, i.e. purified, petroleum hydrocarbons particularly light mineral seal oil, decolorized kerosene, refined gas oil and very light lubricating oils and the like, which are normally employed in agricultural sprays, or in emulsion form. In the latter case, a pesticidal amount of the halogenated phenyl propynyl ether in the smallest quantity possible of either acetone, methyl ethyl ketone or dioxane and the solution diluted with a desired quantity of a light petroleum hydrocarbon containing a sufficient amount of any well known surface active agent as emulsifier.

The amount of the halogenated phenyl propynyl ether to be employed in the control and eradication of chewing or sucking insects, fungi and nematodes may range from 0.001 to 20% by weight of liquid carrier. For practical purposes. I have found that an amount ranging from 0.01 to 5.0% by weight of the halogenated phenyl propynyl ethers are sufficient to yield a sprayable composition which will insure complete control of both chewing and sucking insects with an average kill above 90%.

To prepare the suspension of the halogenated phenyl propynyl ethers in an aqueous medium, a sufficient quantity thereof is first dissolved in a sufficient quantity of the aforementioned water-miscible organic solvent to yield a solution containing from 5 to 40% by weight of the pesticidal agent. To the resulting concentrated solution, there is added from 1 to 5% by weight of any commercially available surface active agent and the resulting concentrated solution diluted with water to yield a concentration of from 0.001 to 20% by weight of the halogenated phenyl propynyl ethers. As an alternative, the halogenated phenyl propynyl ether may be first dissolved in any one of the foregoing water-miscible organic solvents and then diluted with water containing a sufficient quantity of a surface active agent.

For nematode control and eradication the halogenated phenyl propynyl ethers may be employed in the form of aqueous dispersion or emulsion in a concentration ranging from 0.001 to 20% by weight of the halogenated phenyl propynyl ether. The halogenated phenyl propynyl ethers have the advantage as nematocides in that they are not dangerous if accidentally spilled on the skin, shoes or clothing and will not cause skin irritation or injury to plants. Since all of the halogenated phenyl propynyl ethers are solids they do not emit any vapors which cause symptoms associated with the inhalation of the vapors of liquid chlorinated organic compounds.

The following examples will illustrate the manner in which the halogenated phenyl propynyl ethers, pesticidal agents, may be employed in the control and eradication of destructive insects, fungi and nematodes:

EXAMPLE I

A sufficient quantity of each of the pesticidal agents of illustrations (1) to (7) inclusive were first dissolved separately in a small quantity of acetone and the resulting solution diluted with water containing .01% by weight of an emulsifying agent to yield an aqueous emulsion. A sufficient quantity of the emulsion was taken which would contain 50 ml. of the pesticidal compound and the resulting emulsions subjected to the following test procedure.

Duplicate 100-gram samples of dry sand were mixed with 5-gram samples of a brei of tomato roots infested with root-knot nematodes, meliodogyne incognita, the brei was prepared by cutting tomato roots of infested plants into quarter inch lengths, then further macerating in a Waring Blendor for one minute. The sand and brei were mechanically mixed by shaking for one minute in a closed Mason jar. The mixture was transferred to 2¼" clay pots at which time 50 mg. of test chemical was added to the mixture. Each pot was then wrapped in Saran and allowed to stand for 24 hours.

The mixture was then transferred to stainless steel cylindrical screens approximately 2½" high and 3½" in diameter. The screen material was 17 mesh stainless steel wire cloth. These screens were placed in the bottom half of a 9 cm. Petri dish containing 25 ml. of water and covered with the Petri dish cover. In a short time an additional 10 ml. of distilled water was added to each plate in order that free water would be available in the dish. After 24 hours, microscopic counts were made of the living nematodes which had migrated through the screen and into the Petri dish.

The results obtained were as follows:

| Pesticidal Agent | Living Nematodes in 10 Fields | Percent Kill |
|---|---|---|
| (1) | 0 | 100 |
| (2) | 0 | 100 |
| (3) | 0 | 100 |
| (4) | 0 | 100 |
| (5) | 34 | 72 |
| (6) | 38 | 69 |
| (7) | 14 | 89 |
| Blank Control | 120 | 0 |

EXAMPLE II

Late blight fungus, *Phytophthora infestans*, was the organism used in this test procedure. The organism was reared on sterile wheat seeds in a flask kept at room temperature. Organisms used were transferred 10 days prior to testing. A slurry was made of the mycelia and this was broken up by means of a Waring Blendor before application to the test plants.

Duplicate tomato plants, Bonney Best variety, 4 to 5 inches high were placed on a rotating turntable and sprayed with the pesticidal agents (1) to (7) formulated in 90 ml. of water, 10 ml. of acetone and 0.01% of a surface active agent obtained by the condensation of one mole nonyl phenol with 15 moles of ethylene oxide. The resulting 7 aqueous dispersions each contained 1000 p.p.m. of the pesticidal agent. One hundred to 110 ml. of each solution was applied to the pair of plants using a DeVilbis spray gun with air pressure set at 40 lbs. Applications of this spray took 30 seconds and the foliage was wetted to run off. Six plants were sprayed with the formulation without pesticidal agent held as checks (blank control). An additional six plants were sprayed with "Captan" and and were held for comparison standards. As soon as the spray had dried, the plants were inoculated by again placing them on the turntable and spraying with the mycelial brei for 30 seconds.

Following inoculation, the plants were incubated for 48 hours at 72° F., and at 100% relative humidity. The plants were then removed from the incubation chamber and placed in a shade house in the greenhouse for an additional 48 hours.

The total number of lesions per eleven 15× magnifications fields on 11 leaflets on the three top leaves of each plant were counted. A similar count was made on the check plants and on the plants treated with standard. The average number of lesions per plant was calculated. Control was rated according to the percent control of the disease. The results obtained are as follows:

Pesticidal agent: Percent kill
  (1) _____ 88
  (2) _____ 83
  (3) _____ 89
  (4) _____ 90
  (5) _____ 75
  (6) _____ 69
  (7) _____ 98
  "Captan" _____ 100
  Blank Control _____ 0

EXAMPLE III 0.2 gram portions of each of the pesticidal agents (1) to (7) inclusive was separately dissolved in 10 ml. of acetone 0.02 ml. of a surface active agent obtained commercially under the brand name of Triton X–155 (Rohm & Haas) and sufficient water added to make up 100 mls. Two leaves of the tendergreen beans were dipped in each of the prepared solutions. The leaves were allowed to dry thoroughly without withering by placing the stems in water filled bottles. After the leaves had dried, they were placed in two 9 cm. Petri dishes, the bottoms of which had been lined with filter paper which had been moistened with 1 ml. of water to keep the leaf bait attractive to armyworm. Eight armyworms (4 replicated Petri dishes) 8 to 9 days old, were immediately placed to feed on the treated leaves. Data on mortality and amount of feeding were recorded after a period of 72 hours. If activity was indicated by 75% control or better, the pesticidal agent was carried into dosage dilution series by dilution of the initial solution with water to determine the effective limit.

Substitution of deodorized kerosene (Deo Base) for the acetone (10 ml.) in the above formulation greatly enhanced the activity of certain pesticidal agents as will be noted from the following test results:

| Pesticidal Agent | Percent Kill Formulated with Acetone | Percent Kill Formulated with Deo Base |
|---|---|---|
| (1) | 80 at 2,000 p.p.m. | |
| (2) | 100 at 2,000 p.p.m., 20 at 1,000 p.p.m. | |
| (3) | 100 at 2,000 p.p.m., 10 at 500 p.p.m. | |
| (4) | 80 at 2,000 p.p.m. | 100 at 2,000 p.p.m., 100 at 125 p.p.m. |
| (5) | 90 at 2,000 p.p.m. | 100 at 2,000 p.p.m., 100 at 125 p.p.m. |
| (6) | 100 at 2,000 p.p.m., 65 at 2,000 p.p.m. | 70 at 500 p.p.m. |

The pesticidal agents of illustrations (1) to (7) inclusive are very effective in a concentration ranging from 0.001 to 20% by weight either as dusting powders, aqueous dispersions or emulsions in the control or eradication of the red spidermites, aphids, and the like. All diseases that primarily attack underground parts, and which are due to soil borne organisms such as root-rot, wilt, root-knot, symphlids and the like are effectively controlled by spraying the soil with aqueous dispersions or emulsions of the pesticidal agents in a concentration ranging from 0.001 to 20%.

I claim:

1. A method of controlling and eradicating nematodes from nematode infested soil which comprises applying to said soil a nematocidal amount of a halogenated phenyl propynyl ether having the following general formula:

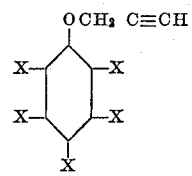

wherein X represents a member selected from the class consisting of hydrogen and chlorine and at least one of the X's being chlorine.

2. The method according to claim 1 wherein the halogenated phenyl propynyl ether is 2-chlorophenyl propynyl ether.

3. The method according to claim 1 wherein the halogenated phenyl propynyl ether is 4-chlorophenyl propynyl ether.

4. The method according to claim 1 wherein the halogenated phenyl propynyl ether is 2,4-dichlorophenyl propynyl ether.

5. The method according to claim 1 wherein the halogenated phenyl propynyl ether is 2,4,5-trichlorophenyl propynyl ether.

6. The method according to claim 1 wherein the halogenated phenyl propynyl ether is 2,4,6-trichlorophenyl propynyl ether.

7. The method according to claim 1 wherein the halogenated phenyl propynyl ether is 2,3,4,6-tetrachlorophenyl propynyl ether.

8. The method according to claim 1 wherein the halogenated phenyl propynyl ether is 2,3,4,5,6-pentachlorophenyl propynyl ether.

References Cited

UNITED STATES PATENTS 2,942,014  6/1960  Cameron.
2,933,934  7/1961  Rosen _____ 260—612

ALBERT T. MEYERS, *Primary Examiner.*

D. MAHANAND, *Assistant Examiner.*